US012245172B2

(12) United States Patent
Huang et al.

(10) Patent No.: US 12,245,172 B2
(45) Date of Patent: Mar. 4, 2025

(54) SIGNALING AND SCHEDULING TO ENABLE NETWORK CONFIGURED SMALL GAPS IN INTRA-BAND INTER-FREQUENCY MEASUREMENT

(71) Applicant: QUALCOMM Incorporated, San Diego, CA (US)

(72) Inventors: Chu-Hsiang Huang, San Diego, CA (US); Yongle Wu, San Diego, CA (US); Arvind Vardarajan Santhanam, San Diego, CA (US); Changhwan Park, San Diego, CA (US); Mihir Vijay Laghate, San Diego, CA (US); Carlos Cabrera Mercader, Cardiff, CA (US); Valentin Alexandru Gheorghiu, Yokohama (JP); Mouaffac Ambriss, San Diego, CA (US)

( * ) Notice: Subject to any disclaimer, the term of this patent is extended or adjusted under 35 U.S.C. 154(b) by 415 days.

(21) Appl. No.: 17/669,018

(22) Filed: Feb. 10, 2022

(65) Prior Publication Data
US 2023/0139555 A1    May 4, 2023

Related U.S. Application Data

(60) Provisional application No. 63/274,406, filed on Nov. 1, 2021.

(51) Int. Cl.
*H04W 56/00* (2009.01)
*H04L 1/1607* (2023.01)
(Continued)

(52) U.S. Cl.
CPC ......... *H04W 56/001* (2013.01); *H04L 1/1642* (2013.01); *H04W 24/10* (2013.01); *H04W 76/30* (2018.02)

(58) Field of Classification Search
CPC ............... H04L 1/1642; H04L 1/1829; H04L 2001/0097; H04W 24/10; H04W 56/00;
(Continued)

(56) References Cited

U.S. PATENT DOCUMENTS 11,223,967 B2 *  1/2022  Lee .................... H04B 7/0626
2020/0260311 A1  8/2020  Jung et al.
(Continued)

FOREIGN PATENT DOCUMENTS

WO    2020034568 A1    2/2020

OTHER PUBLICATIONS

3GPP TS 36.331: "3rd Generation Partnership Project; Technical Specification Group Radio Access Network, Evolved Universal Terrestrial Radio Access (E-UTRA), Radio Resource Control (RRC), Protocol Specification (Release 16)", 3GPP Mobile Competence Centre, 650, Route Des Lucioles, F-06921 Sophia-Antipolis Cedex, France, vol. RAN WG2, No. V16.6.0, Sep. 29, 2021, pp. 1-1091, XP052056891, p. 692.
(Continued)

*Primary Examiner* — Robert J Lopata

(57) ABSTRACT

Certain aspects of the present disclosure provide techniques for signaling and scheduling to enable network configured small gaps in intra-band inter-frequency measurement. A method that may be performed by a user equipment (UE) includes receiving, from a serving cell operating on a first frequency, an indication that synchronization signal block (SSB) indexes of a target cell operating on a second frequency can be derived from timing of the serving cell; and deriving an SSB index of the target cell, based on the timing of the serving cell.

30 Claims, 11 Drawing Sheets

(51) Int. Cl.
*H04W 24/10* (2009.01)
*H04W 76/30* (2018.01)

(58) Field of Classification Search
CPC .......... H04W 56/001; H04W 56/0015; H04W 76/28; H04W 76/30
USPC ....................................................... 370/329
See application file for complete search history.

(56) References Cited

U.S. PATENT DOCUMENTS

| | | | |
|---|---|---|---|
| 2021/0029572 A1* | 1/2021 | Harada | H04W 56/001 |
| 2023/0024061 A1* | 1/2023 | Zhang | H04L 5/001 |
| 2023/0051987 A1* | 2/2023 | Harada | H04W 24/08 |
| 2023/0094513 A1* | 3/2023 | Zhang | H04W 72/542 |
| | | | 370/252 |
| 2023/0345285 A1* | 10/2023 | Zheng | H04W 24/10 |
| 2024/0073982 A1* | 2/2024 | Wallentin | H04W 76/15 |
| 2024/0080737 A1* | 3/2024 | Park | H04B 7/18513 |

OTHER PUBLICATIONS

International Search Report and Written Opinion—PCT/US2022/046773—ISA/EPO—Jan. 20, 2023.

* cited by examiner

SIGNALING AND SCHEDULING TO ENABLE NETWORK CONFIGURED SMALL GAPS IN INTRA-BAND INTER-FREQUENCY MEASUREMENT

CROSS REFERENCE TO RELATED APPLICATIONS

This application claims benefits of and priority to U.S. Provisional Patent Application No. 63/274,406, filed on Nov. 1, 2021, which is assigned to the assignee hereof and herein incorporated by reference in the entirety as if fully set forth below and for all applicable purposes.

BACKGROUND

Field of the Disclosure

Aspects of the present disclosure relate to wireless communications, and more particularly, to techniques for enabling network configured small gaps in intra-band inter-frequency measurements.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include more efficient usage of transmission resources and higher throughput in wireless networks.

Certain aspects of the subject matter described in this disclosure can be implemented in a method for wireless communication by a user equipment (UE). The method generally includes receiving, from a serving cell operating on a first frequency, an indication that synchronization signal block (SSB) indexes of a target cell operating on a second frequency can be derived from timing of the serving cell; and deriving an SSB index of the target cell, based on the timing of the serving cell.

Certain aspects of the subject matter described in this disclosure can be implemented in a method for wireless communication by a serving cell operating on a first frequency. The method generally includes transmitting, to a user equipment (UE), an indication that synchronization signal block (SSB) indexes of a target cell operating on a second frequency can be derived from timing of the serving cell; and refraining from scheduling the UE to transmit or receive a communication during a period comprising: consecutive SSB symbols to be measured from the target cell within an SSB measurement time configuration (SMTC) window duration, 1 data symbol before the consecutive SSB symbols to be measured, and 1 data symbol after the consecutive SSB symbols to be measured.

Certain aspects of the subject matter described in this disclosure can be implemented in an apparatus for wireless communication at a user equipment (UE). The apparatus generally includes a processor; memory coupled with the processor; and instructions stored in the memory and executable by the processor to cause the apparatus to: receive, from a serving cell operating on a first frequency, an indication that synchronization signal block (SSB) indexes of a target cell operating on a second frequency can be derived from timing of the serving cell; and derive an SSB index of the target cell, based on the timing of the serving cell.

Certain aspects of the subject matter described in this disclosure can be implemented in an apparatus for wireless communication at a serving cell operating on a first frequency. The apparatus generally includes a processor; memory coupled with the processor; and instructions stored in the memory and executable by the processor to cause the apparatus to: transmit, to a user equipment (UE), an indication that synchronization signal block (SSB) indexes of a target cell operating on a second frequency can be derived from timing of the serving cell; and refrain from scheduling the UE to transmit or receive a communication during a period comprising: consecutive SSB symbols to be measured from the target cell within an SSB measurement time configuration (SMTC) window duration, 1 data symbol before the consecutive SSB symbols to be measured, and 1 data symbol after the consecutive SSB symbols to be measured.

Certain aspects of the subject matter described in this disclosure can be implemented in an apparatus for wireless communication at a user equipment (UE). The apparatus generally includes means for receiving, from a serving cell operating on a first frequency, an indication that synchronization signal block (SSB) indexes of a target cell operating on a second frequency can be derived from timing of the serving cell; and means for deriving an SSB index of the target cell, based on the timing of the serving cell.

Certain aspects of the subject matter described in this disclosure can be implemented in an apparatus for wireless communication at a serving cell operating on a first frequency. The apparatus generally includes means for transmitting, to a user equipment (UE), an indication that synchronization signal block (SSB) indexes of a target cell operating on a second frequency can be derived from timing of the serving cell; and means for refraining from scheduling the UE to transmit or receive a communication during a period comprising: consecutive SSB symbols to be measured from the target cell within an SSB measurement time configuration (SMTC) window duration, 1 data symbol before the consecutive SSB symbols to be measured, and 1 data symbol after the consecutive SSB symbols to be measured.

Certain aspects of the subject matter described in this disclosure can be implemented in a computer readable medium storing computer executable code thereon for wireless communications. The computer executable code thereon generally includes code for receiving, from a serving cell operating on a first frequency, an indication that synchronization signal block (SSB) indexes of a target cell operating on a second frequency can be derived from timing of the serving cell; and code for deriving an SSB index of the target cell, based on the timing of the serving cell.

Certain aspects of the subject matter described in this disclosure can be implemented in a computer readable medium storing computer executable code thereon for wireless communication by a serving cell operating on a first frequency. The computer executable code thereon generally includes code for transmitting, to a user equipment (UE), an indication that synchronization signal block (SSB) indexes of a target cell operating on a second frequency can be derived from timing of the serving cell; and code for refraining from scheduling the UE to transmit or receive a communication during a period comprising: consecutive SSB symbols to be measured from the target cell within an SSB measurement time configuration (SMTC) window duration, 1 data symbol before the consecutive SSB symbols to be measured, and 1 data symbol after the consecutive SSB symbols to be measured.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
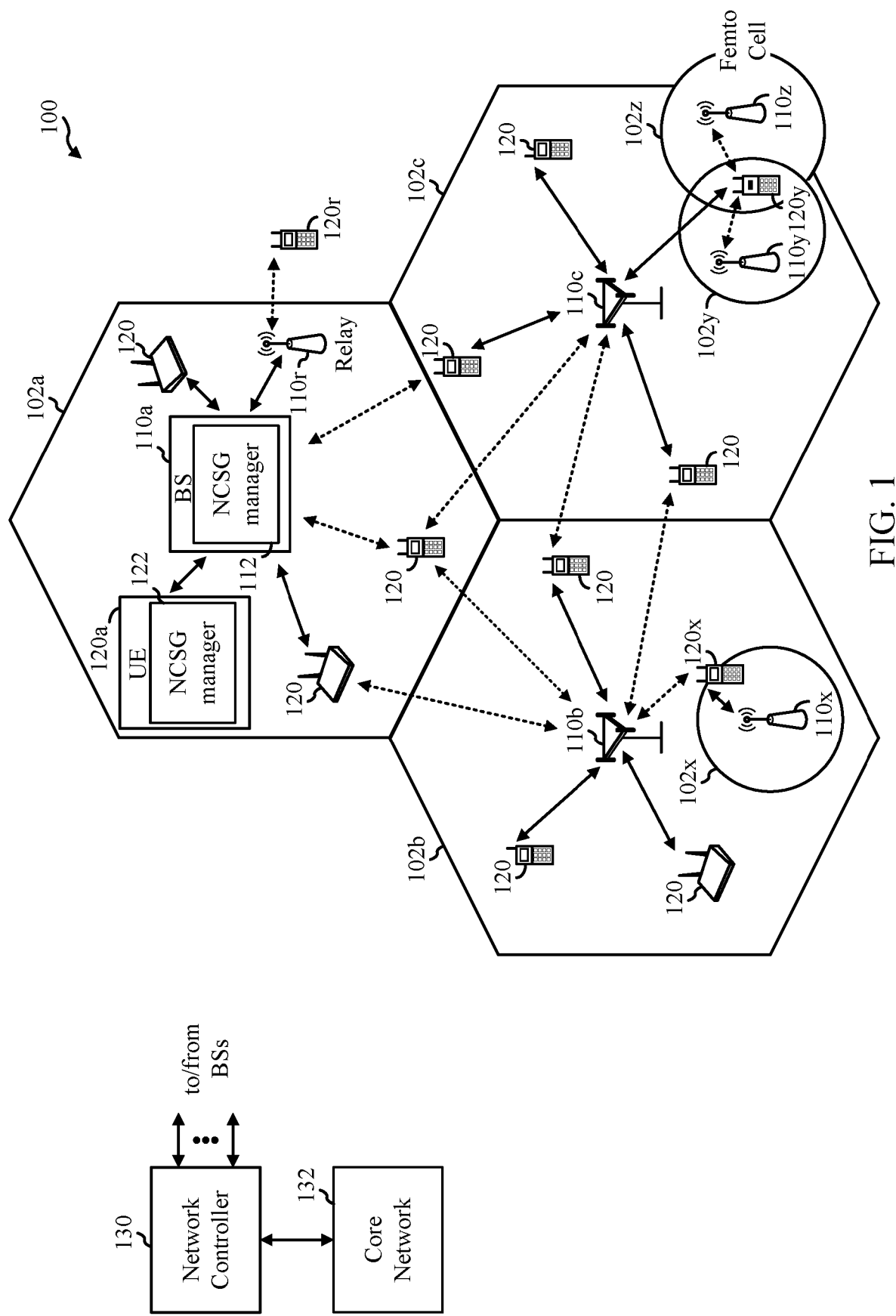
FIG. 1 is a block diagram conceptually illustrating an example wireless communication network, in accordance with certain aspects of the present disclosure.

Aspects of the present disclosure provide apparatus, methods, processing systems, and computer readable mediums for enabling network configured small gaps (NCGSs) in intra-band inter-frequency measurement and in inter-band measurement with serving cell band and target cell band using common beam management (CBM). When a UE with a spare receive chain determines (e.g., in response to a handover command) to measure another cell (referred to herein as a target cell), the UE may use the spare receive chain for measuring the target cell. While measuring the target cell, the UE cannot transmit or receive from the serving cell, if the receive chain(s) for serving cell data and the spare receive chain(s) for measurement are using a common beam, since transmitting or receiving can interfere with the measurement. If the UE can derive the synchronization signal block (SSB) indexes of the target cell from information provided by the serving cell, and if the period the UE is scheduled to transmit or receive overlaps the SSB symbols of the target cell or one symbol before or after the SSB symbols of the target cell, then the UE can receive serving cell data with one beam and switch to another beam for target cell measurement on the target cell SSB symbols. Determining the target cell SSB indexes (e.g., deriving the indexes from information provided by the serving cell) shortens the period that the UE is unable to be scheduled to transmit or receive, as compared to previously known techniques in which the UE cannot be scheduled to transmit or receive during the entire SSB measurement time configuration (SMTC) window duration, because the UE may be receiving from or measuring the target cell during the entire SMTC window duration in the previously known techniques.

The following description provides examples of enabling network configured small gaps (NCGSs) in intra-band inter-frequency measurements in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple-input multiple-output (MIMO) transmissions with precoding may also be supported. MIMO configurations in the DL may support up to 8 transmit antennas with multi-layer DL transmissions of up to 8 streams in total and up to 2 streams per UE. Multi-layer transmissions (e.g., by a UE) with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for enabling network configured small gaps (NCGSs) in intra-band inter-frequency measurements. As shown in FIG. 1, the BS 110a includes an NCSG manager 112 that transmits, to a UE (e.g., UE 120a), an indication that synchronization signal block (SSB) indexes of a target cell (e.g., cell 102b) operating on a second frequency can be derived from timing of a serving cell (e.g., cell 102a) and refrains from scheduling the UE to transmit or receive a communication during a period comprising: a first NCSG, consecutive SSB symbols to be measured from a target cell within an SSB measurement time configuration (SMTC) window duration, 1 data symbol before the consecutive SSB symbols to be measured, 1 data symbol after the consecutive SSB symbols to be measured, and a second NCSG, in accordance with aspects of the present disclosure. The UE 120a includes an NCSG manager 122 that receives, from a serving cell (e.g., cell 102a) operating on a first frequency, an indication that synchronization signal block (SSB) indexes of a target cell (e.g., cell 102b) operating on a second frequency can be derived from timing of the serving cell and derives an SSB index of the target cell, based on the timing of the serving cell, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
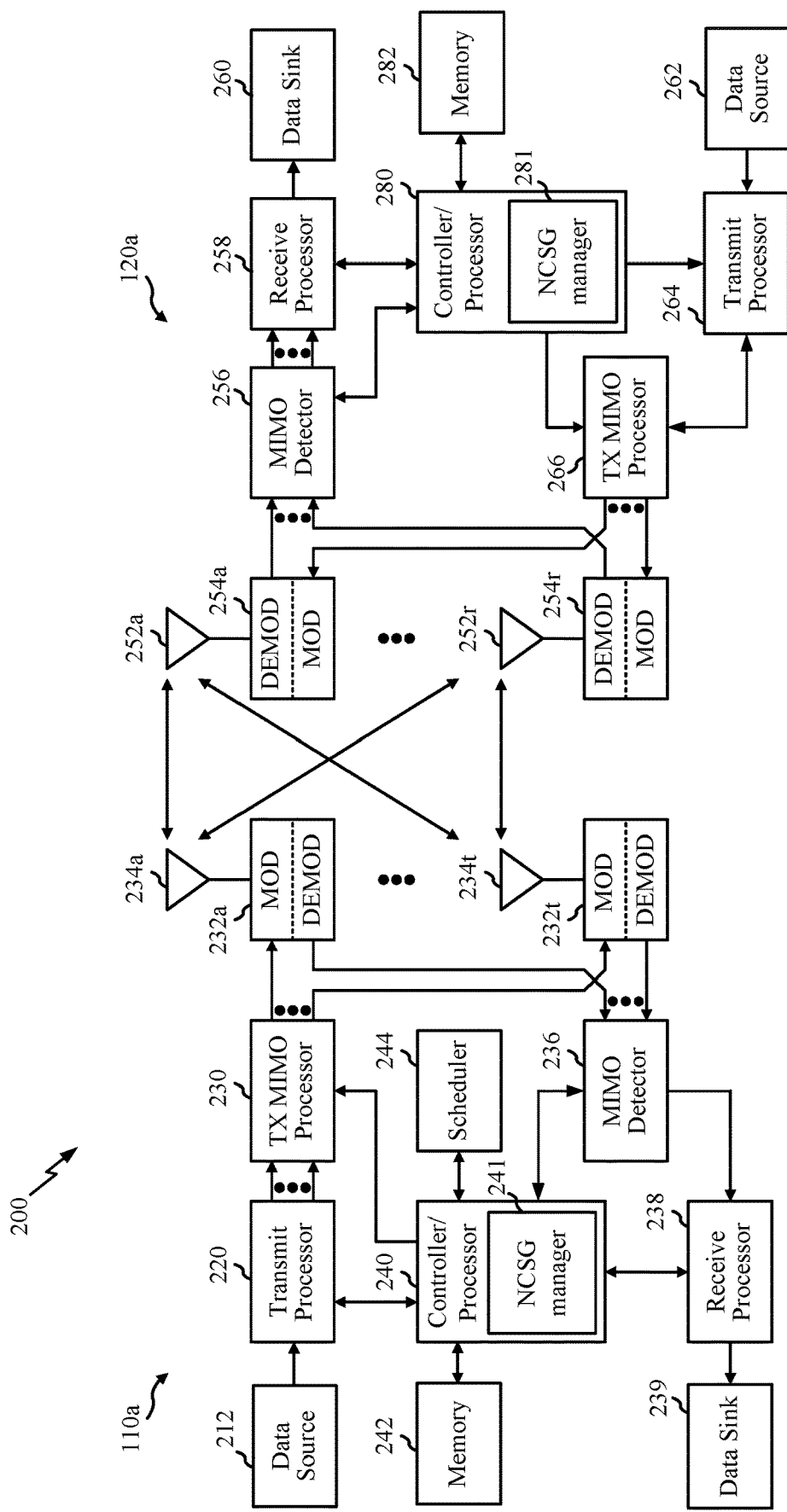
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an NCSG manager 241 that transmits, to a user equipment (UE), an indication that synchronization signal block (SSB) indexes of a target cell operating on a second frequency can be derived from timing of a serving cell; and refrains from scheduling the UE to transmit or receive a communication during a period comprising: a first NCSG, consecutive SSB symbols to be measured from a target cell within an SSB measurement time configuration (SMTC) window duration, 1 data symbol before the consecutive SSB symbols to be measured, 1 data symbol after the consecutive SSB symbols to be measured, and a second NCSG, according to aspects described herein. As shown in FIG. 2, the controller/processor 280 of the UE 120a has an NCSG manager 281 that receives, from a serving cell operating on a first frequency, an indication that synchronization signal block (SSB) indexes of a target cell operating on a second frequency can be derived from timing of the serving cell; and derives an SSB index of the target cell, based on the timing of the serving cell, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
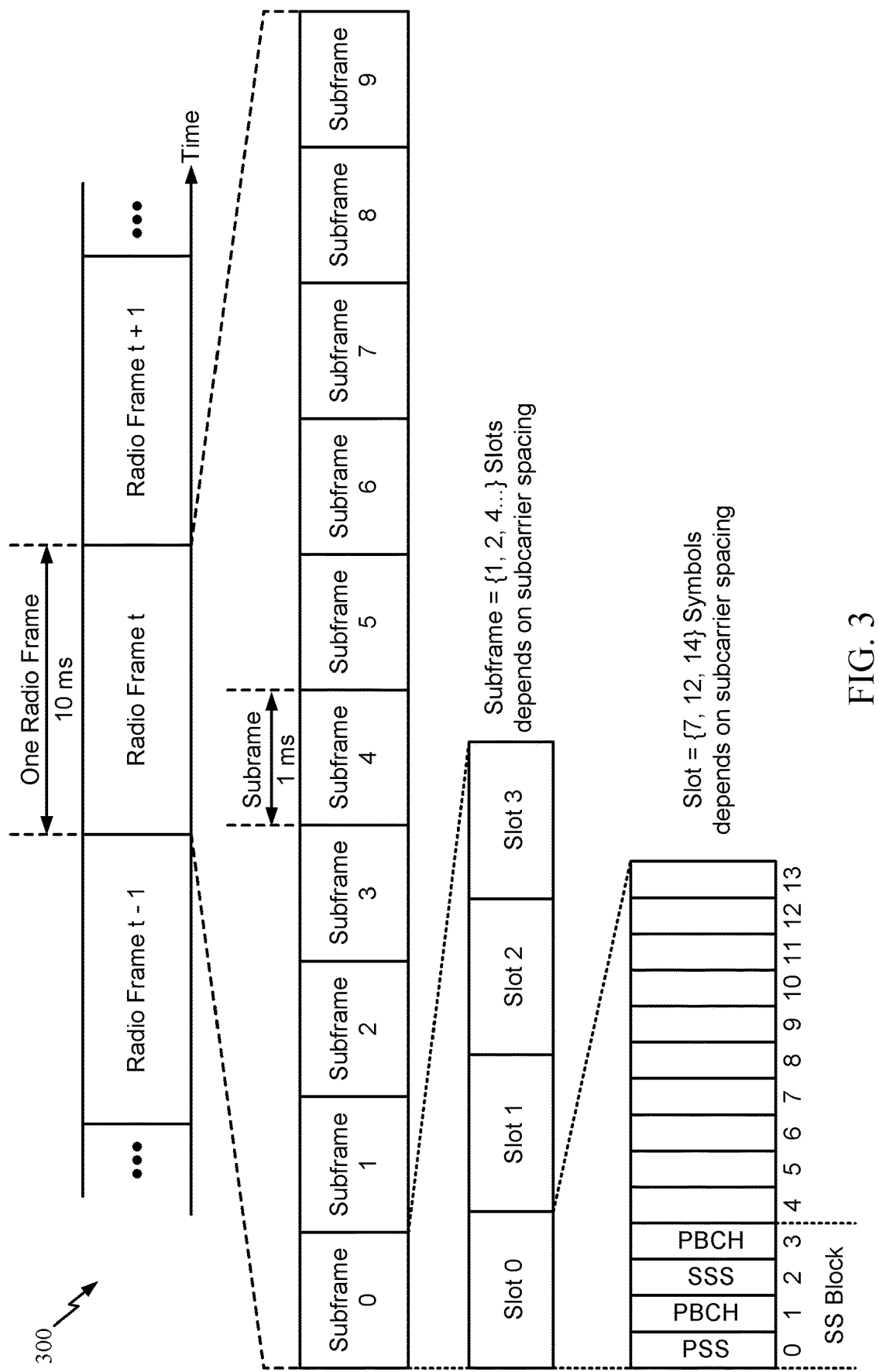
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two-symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS burst sets can be transmitted in different frequency regions.

Figure 4:
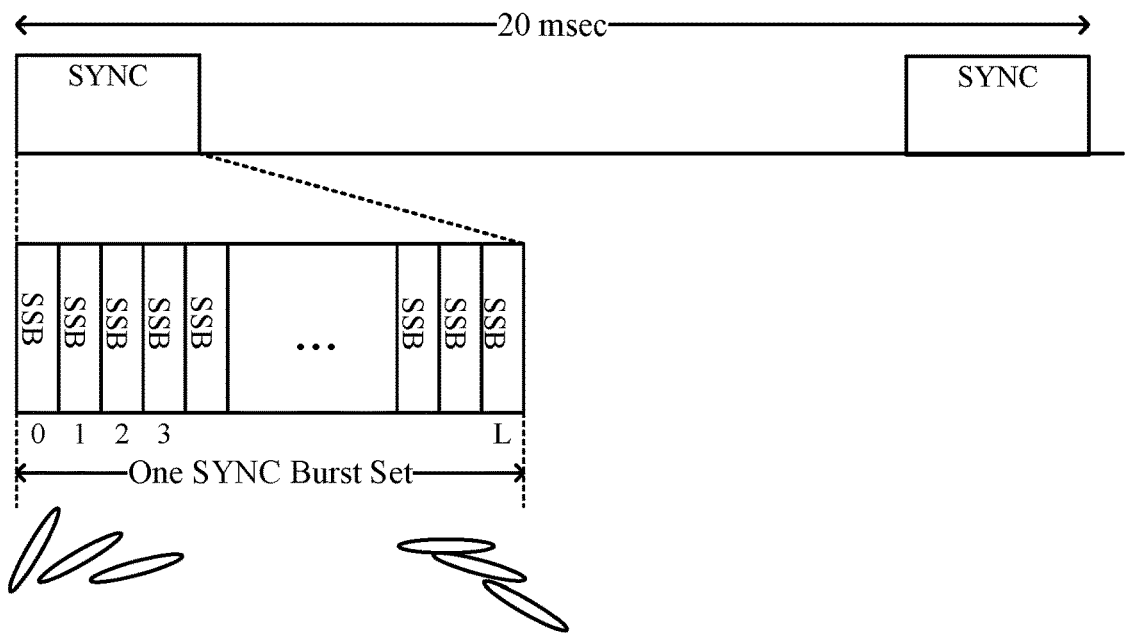
FIG. 4 illustrates how different synchronization signal blocks (SSBs) may be sent using different beams, according to aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (particularly for mmW applications). A physical cell identity (PCI) may be decoded from the PSS and SSS of the SSB.

Figure 5:
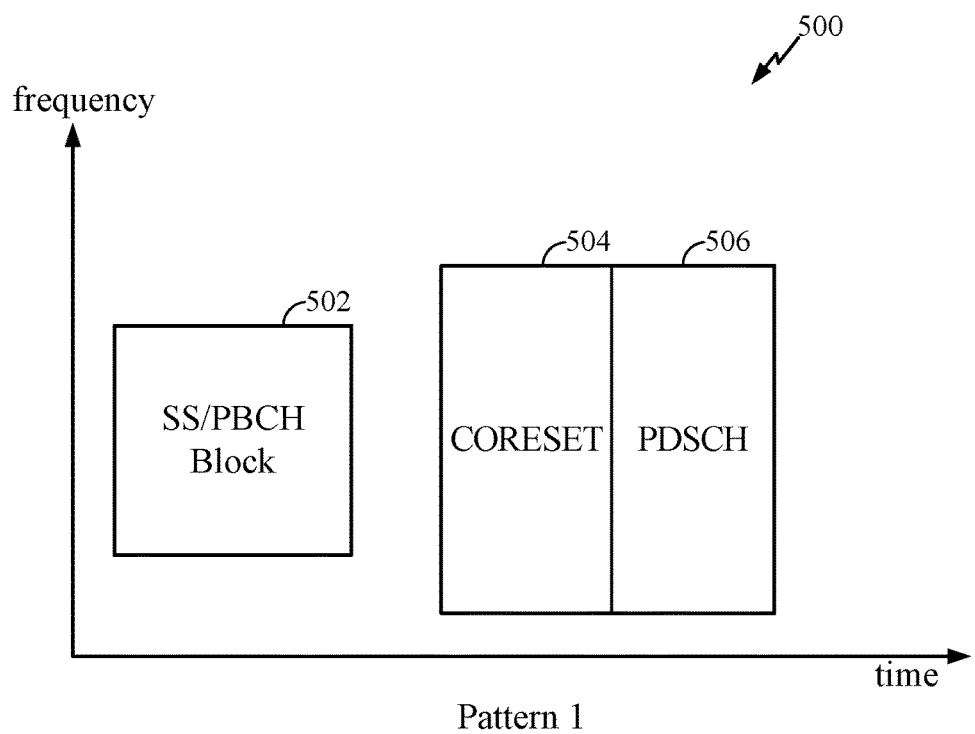
FIG. 5 shows an exemplary transmission resource mapping, according to aspects of the present disclosure.

FIG. 5 shows an exemplary transmission resource mapping 500, according to aspects of the present disclosure. In the exemplary mapping, a BS (e.g., BS 110a, shown in FIG. 1) transmits an SS/PBCH block 502. The SS/PBCH block includes a MIB conveying an index to a table that relates the time and frequency resources of the CORESET 504 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 506. The BS then transmits the PDSCH to the UE. The UE may receive the master information block (MIB) in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was scheduled (e.g., had resources allocated for it) by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

Further, REG bundles may be used to convey CORESETs. REGs in an REG bundle may be contiguous in a frequency and/or a time domain. In certain cases, the time domain may be prioritized before the frequency domain. REG bundle sizes may include: 2, 3, or 6 for interleaved mapping and 6 for non-interleaved mapping.

As noted above, sets of CCEs may be used to transmit new radio PDCCHs (NR-PDCCHs), with different numbers of CCEs in the sets used to transmit NR-PDCCHs using differing aggregation levels.

Figure 6A:
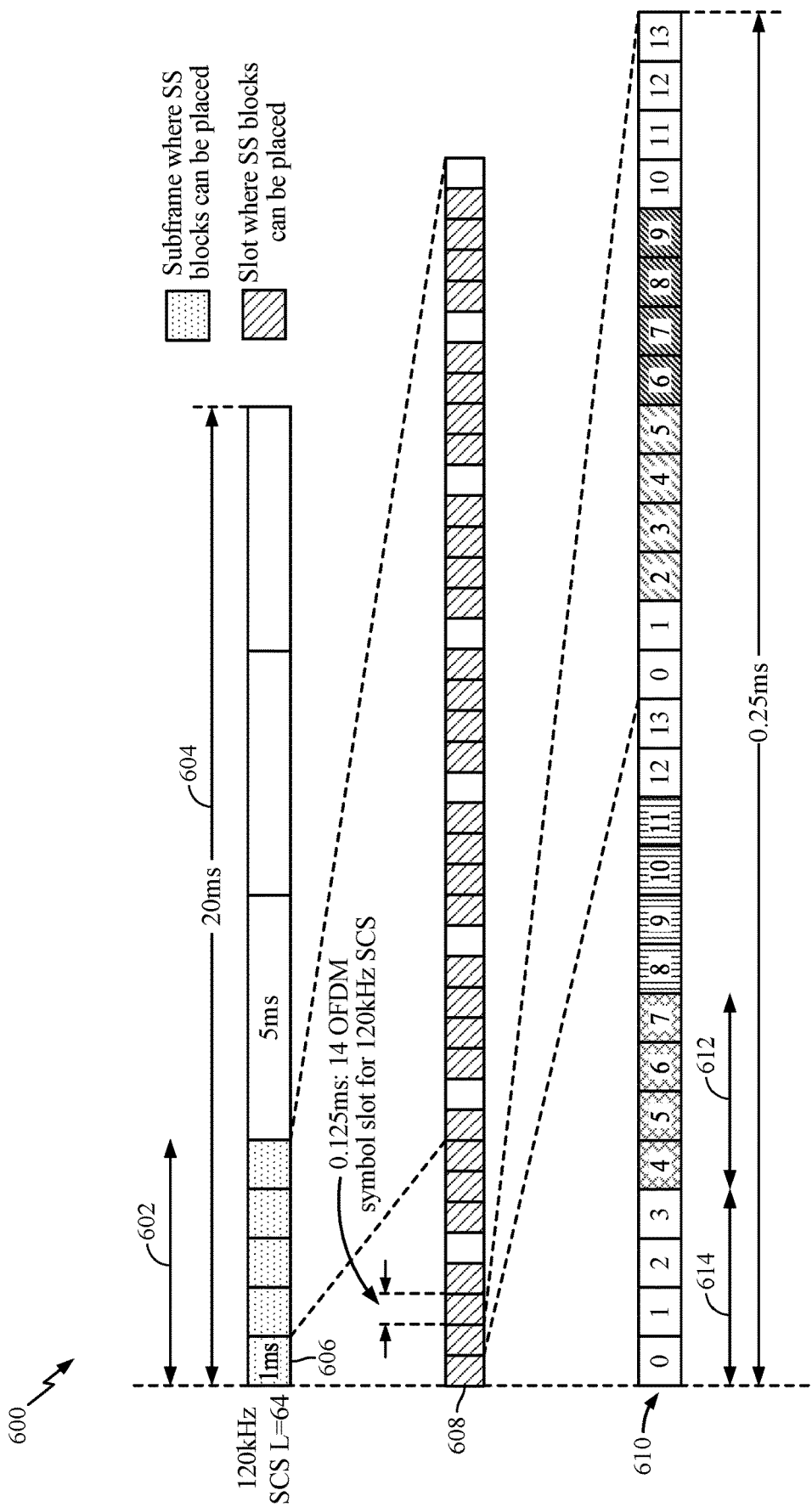
FIGS. 6A and 6B illustrate examples of SSB patterns for different subcarrier spacings (SCSs), according to aspects of the present disclosure.
Figure 6B:
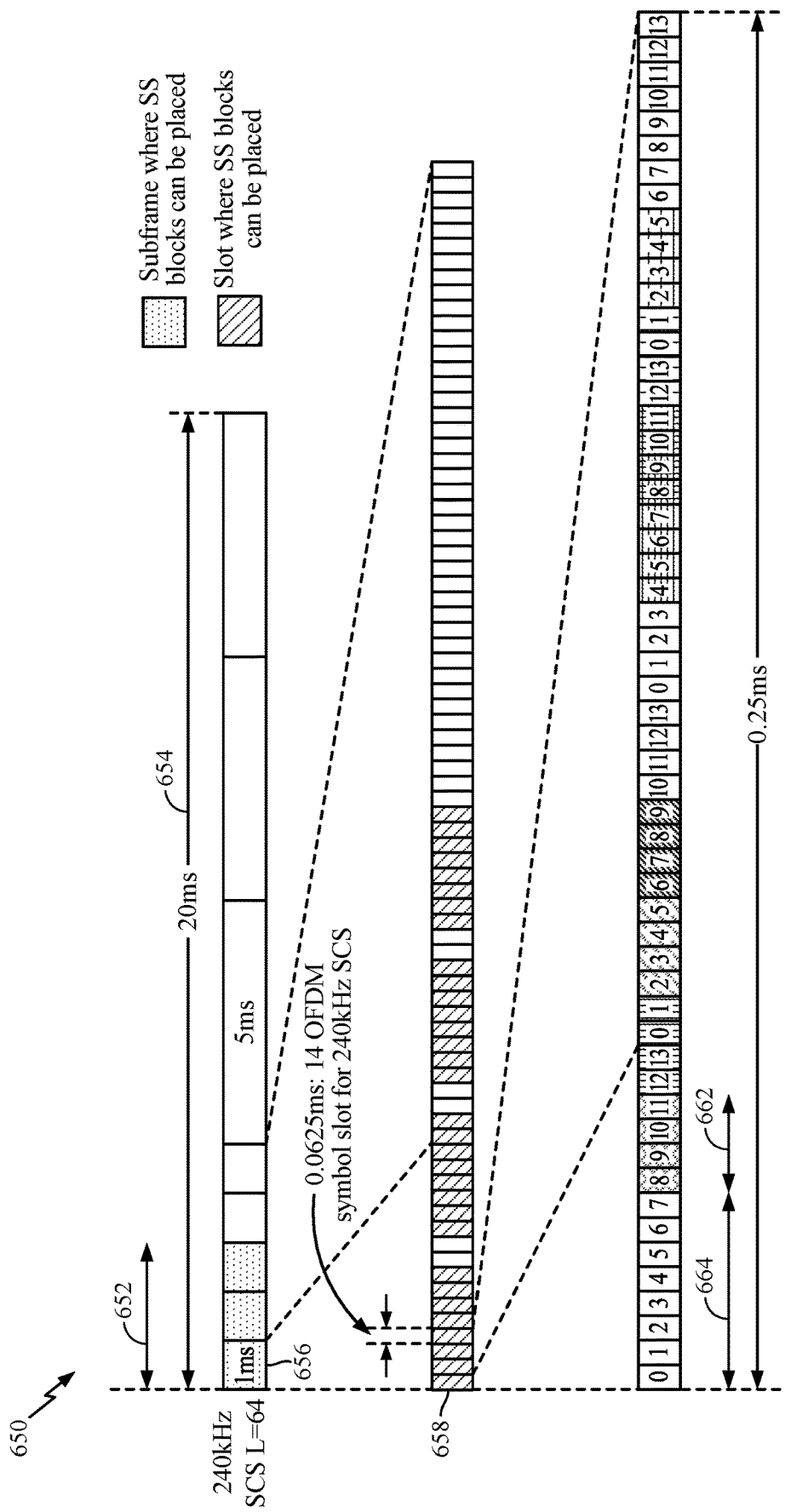

FIGS. 6A and 6B illustrate examples 600 and 650 of SSB patterns for different subcarrier spacings (SCSs), according to aspects of the present disclosure. A BS, such as BS 110a shown in FIG. 1, may transmit SS in one period (e.g. 5 subframes) 602 during each 20 ms period 604. As mentioned above, a subframe 606 can be divided into a plurality of slots 608. For example, in a communications system using a subcarrier spacing (SCS) of 120 kHz, a subframe may be divided into eight slots, each 0.125 ms long. Each slot may include 14 OFDM symbols 610. The BS may transmit an SS block 612 of up to four consecutive OFDM symbols during one or more slots. The BS may transmit different SS blocks using different transmit beams (e.g., for beam-sweeping). Each SS block may include, for example, a primary synchronization signal (PSS), a secondary synchronization signal (SSS), and one or more physical broadcast channels (PBCHs), also referred to as synchronization channels. See also FIG. 7 for an illustration of an SS block. Symbols that are not used for SS, such as the symbols 614, may be used for transmitting PDCCH, PDSCH, and other channels.

In the exemplary SSB pattern 650 shown in FIG. 6B, each subframe 656 is divided into 16 slots 658 that are each 0.0625 ms long, as may be used in a wireless communications system using an SCS of 240 kHz. A BS, such as BS 110a shown in FIG. 1, may transmit SS in one period (e.g. 3 subframes) 652 during each 20 ms period 654. While the length of a slot and an OFDM symbol may vary depending on the SCS used, the SS blocks 662 and 612 (see FIG. 6A)

are up to four OFDM symbols long. Symbols that are not used for SS, such as the symbols 664, may be used for transmitting PDCCH, PDSCH, and other channels.

Figure 7:
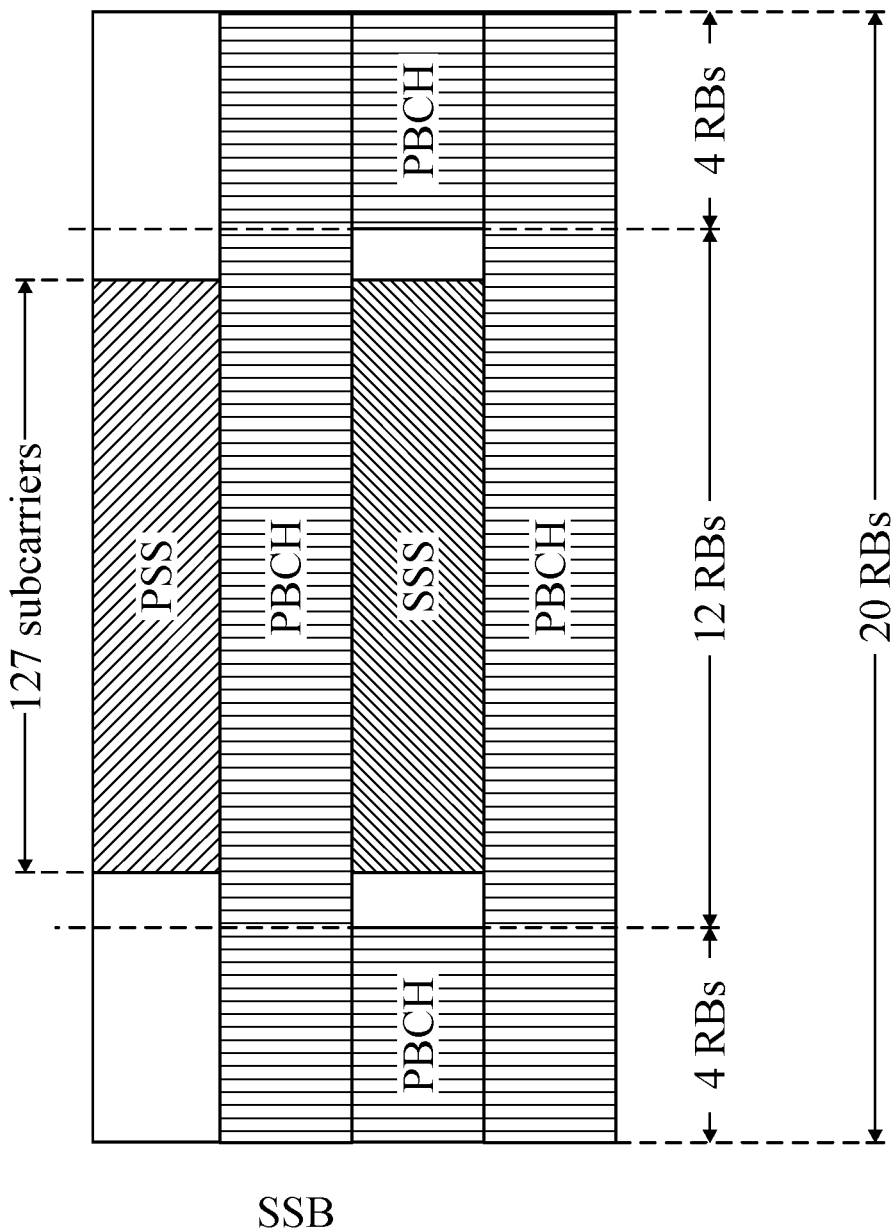
FIG. 7 illustrates example SSB structure, according to aspects of the present disclosure.

FIG. 7 illustrates an example SSB format. As illustrated, an SSB may include a primary synchronization signal (PSS), a secondary synchronization signal (SSS), and one or more physical broadcast channels (PBCHs).

When a UE is configured to operate using network configured small gaps (NCSGs), the UE has a spare receive chain that the UE can use to measure frequency layers to which the UE is not currently tuned. It may be desirable for the UE to measure other frequencies when the UE is handing over from a serving cell to another cell, referred to herein as a target cell. Measuring another frequency may be facilitated by scheduling a measurement gap for the UE, in previously known techniques.

When using NSCG, the network can configure two small gaps before and after the reference signal (RS) measurement for the spare receive chain to retune and change configurations, instead of the previously known large measurement gap that enables RF retuning for a receive chain and covers the entire SMTC window.

There may be a limitation in intra-band inter-frequency measurements and common beam management (CBM) band cases for UEs operating in frequency range 2 (FR2). In these NCSG use cases, even if a UE has a spare receive chain, the UE typically cannot receive data from a serving cell and measure target cell SSBs simultaneously in FR2, unless the target cells to be measured and the serving cell are on two bands in which the UE performs IBM (independent beam management), because the serving cell and the target cell will typically use different codebooks.

There can also be another limitation for UEs performing inter-frequency measurements, in that the UE may be unable to perform neighboring cell SSB index derivation. In previously known techniques, a UE may be signaled with an information element deriveSSB-IndexFromCell that indicates whether the UE may derive an SSB index for a target cell from the SSB index, system frame number (SFN), and frame boundary of the serving cell. However, deriveSSB-IndexFromCell is only applicable for deriving a target cell's SSB index from a serving cell when the target cell and serving cell operate on the same frequency. In previously known techniques, whether a UE can derive an SSB index of a neighboring (target) cell(s) on a frequency different than the serving cell's frequency by using information from the serving cell (e.g., the serving cell's SSB index) is not indicated. For example: assume cell 1 is a serving cell on frequency A, neighboring cells 2 and 3 are on frequency A, and neighboring cells 4 and 5 are on frequency B. Currently known techniques can signal that cells {1, 2, and 3} are synchronized, and cells {4 and 5} are synchronized, but whether cells {1, 2, and 3} and cells {4 and 5} are synchronized cannot be signaled with previously known techniques.

When a UE is without information for deriving the SSB index of target cells, data transmission/reception for the UE is not feasible in the entire SSB measurement time configuration (SMTC) window when the UE is using NCSG in intra-band inter-frequency measurement. That transmission and reception for the UE are not feasible for that period eliminates most of the throughput gain from using NCSG instead of previously known techniques.

If a UE knows (or can derive) the SSB index of the target cell operating on non-serving cell frequencies, then NCSG can be enabled for the UE, with data transmission/reception scheduling for symbols of the SMTC window duration excluding the symbols overlapping with SSB symbols from the target cell. In this case, NCSG can still achieve significant throughput gain, since PDCCH/PUCCH and even PDSCH/PUSCH can be scheduled on the symbols not overlapping with SSB symbols from the target cell.

Accordingly, what is needed are techniques and apparatus for indicating to a UE performing inter-frequency measurements (intra-band and inter-band) that the UE may derive SSB indexes of target cells from the SFN, frame boundary, and/or SSB index of the serving cell of the UE.

Example Signaling and Scheduling to Enable Network Configured Small Gaps in Intra-Band Inter Frequency Measurement Aspects of the present disclosure provide techniques and apparatus for indicating to a UE performing inter-frequency measurements (intra-band and inter-band) that the UE may derive SSB indexes of target cells from the SFN, frame boundary, and/or SSB index of the serving cell of the UE.

In aspects of the present disclosure, broadcast and/or UE specific signaling fields may be transmitted (e.g., by a serving cell) to indicate to a UE whether the UE can utilize the serving cell timing to derive the SSB index(es) of target cell(s) operating on a frequency different than the serving cell frequency. For example, a serving cell may transmit an information element (IE) named, for example, deriveSSB-IndexFreqServingCell. The IE may include up to two fields, with a first mandatory field indicating whether a UE may derive the SSB index of a target cell from the SSB index of the serving cell and a second optional field that may indicate the index of the serving cell within the cell group that the UE may use as a time reference to derive the SSB index of the target cell. Such an IE may, for example, be broadcast in a SIB, delivered in an RRCRelease dedicated message to the UE, or in a measurement object (MO) configuration.

According to aspects of the present disclosure, if the signaling field(s) is set to true, then the UE may assume SFN and frame boundary alignment between the target cell and the serving cell. By assuming SFN and frame boundary alignment between the target cell and the serving cell, the UE may utilize the timing of the serving cell to derive the indexes of SSB transmitted by the target cell(s). Continuing the example from above, if the IE is broadcast in a SIB, the first field is true (i.e., the first field indicates the UE may derive the SSB index of the target cell from information provided by the serving cell), and the second field is absent, then the IE may indicate that a UE may use the timing of the serving cell (e.g., broadcast in a SIB, such as SIB4 or SIB11) to derive the SSB index of all neighbors on a frequency that is listed in the SIB or another (e.g., under InterFreqCarrierFreqInfo). Still in the example from above, if the IE is delivered in an RRCRelease dedicated message (e.g., under the MeasIdleConfig and the MeasIdleCarrierNR objects) to the UE, the first field is true, and the second field is absent, then the IE may indicate that the UE may use the timing of the serving cell (i.e., the cell from which the UE received the RRCRelease message) to derive the SSB index of all neighbors on a frequency (e.g., the frequency indicated by MeasIdleCarrierNR). In the same example, if the IE is delivered in an MO configuration (e.g., under the SSB-ConfigMobility object), the first field is true, and the second field is absent, then the IE may indicate that the UE may use the timing of the serving cell (from which the UE received the MO configuration) to derive the SSB index of all neighbors on the frequency that provided by the MO configuration.

In aspects of the present disclosure, when a UE is performing 1) intra-band inter-frequency measurement or 2) inter-band measurement when the serving cell frequency band and the target cell frequency band are operating with common beam management (CBM), NCSG may be utilized within a frequency layer when the proposed new signaling field(s) are set to true, and the serving cell refrains from scheduling the UE to transmit PUCCH, PUSCH, SRS or receive PDCCH, PDSCH, TRS, CSI-RS for CQI on consecutive SSB symbols to be measured, on 1 data symbol before the consecutive SSB symbols to be measured, and 1 data symbol after the consecutive SSB symbols to be measured within SMTC window duration. For example, a UE may be configured with a measurement object (MO) that indicates a frequency and target cell for the UE to measure. In the example, the UE is not expected to transmit PUCCH, PUSCH, or SRS or receive PDCCH, PDSCH, TRS, or CSI-RS for CQI on SSB symbols to be measured, on 1 data symbol before the consecutive SSB symbols to be measured, and on 1 data symbol after the consecutive SSB symbols to be measured within an SMTC window duration. In another example, a UE may be configured with multiple MOs. In this example, the UE is not expected to transmit PUCCH, PUSCH, or SRS or receive PDCCH, PDSCH, TRS, or CSI-RS for CQI on the union of the SSB symbols to be measured, on 1 data symbol before the consecutive SSB symbols to be measured in the union, and on 1 data symbol after the consecutive SSB symbols to be measured in the union within an SMTC window duration.

Figure 8:
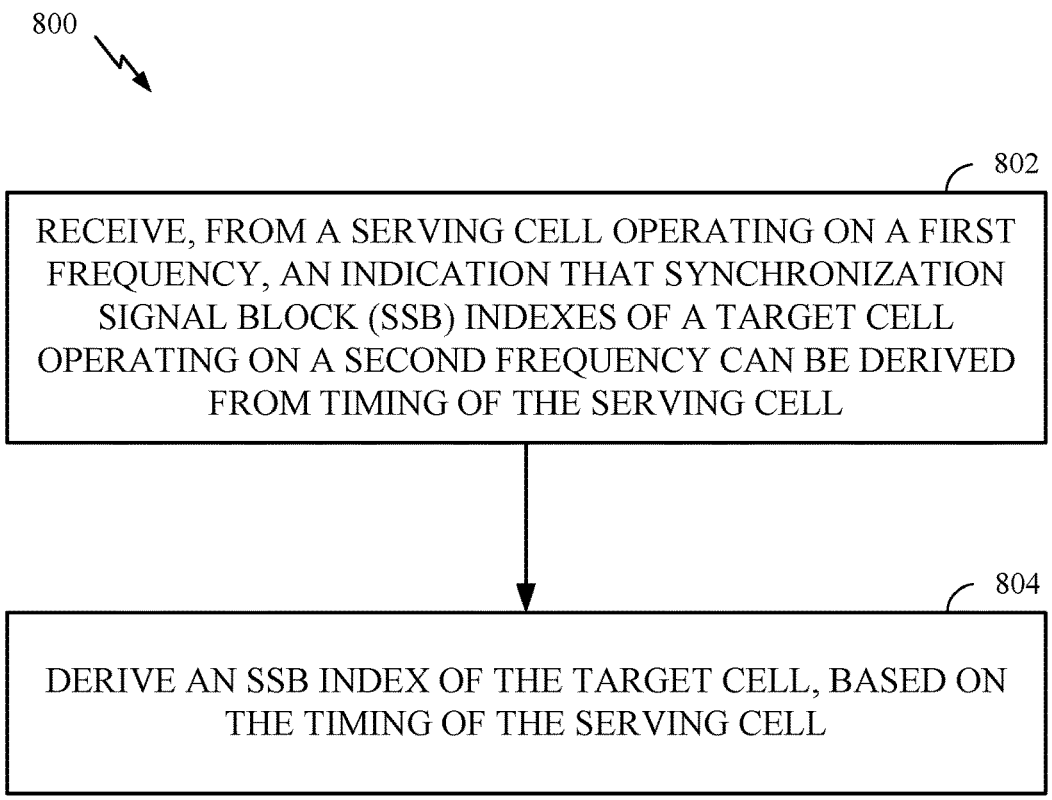
FIG. 8 is a flow diagram illustrating example operations for wireless communication by a UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100). The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 802, by receiving, from a serving cell operating on a first frequency, an indication that synchronization signal block (SSB) indexes of a target cell operating on a second frequency can be derived from timing of the serving cell. For example, UE 120a (see FIG. 1) receives, from a serving cell 102a (served by BS 110a) operating on a first frequency, an indication (e.g., an IE that may be named, for example, deriveSSB-IndexFreqServingCell) that synchronization signal block (SSB) indexes of target cell 102b (served by BS 110b) operating on a second frequency can be derived from timing of the serving cell 102a.

Figure 9:
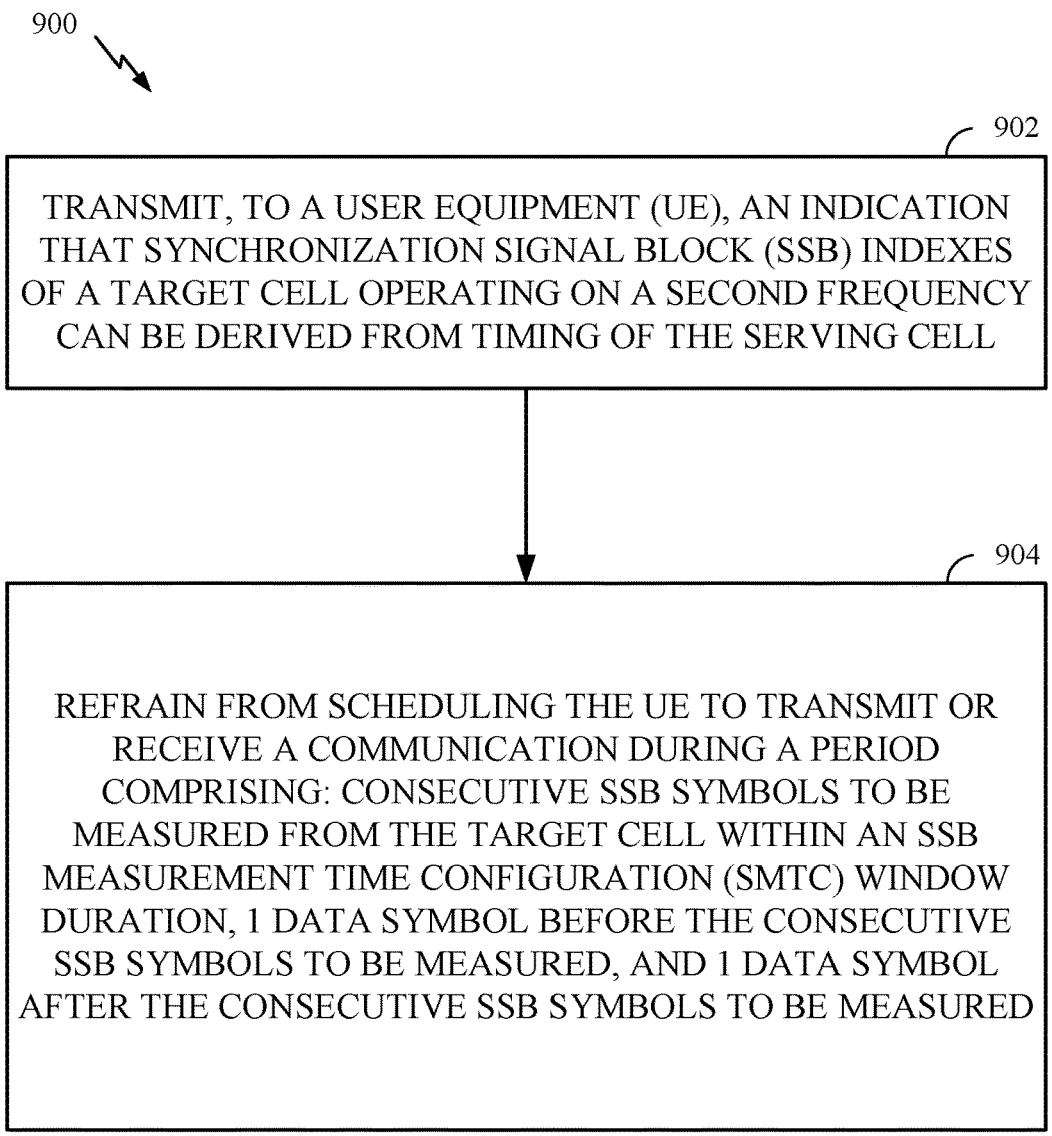
FIG. 9 is a flow diagram illustrating example operations for wireless communication by a BS, in accordance with certain aspects of the present disclosure.

Operations 800 may continue, at block 804, by deriving an SSB index of the target cell, based on the timing of the serving cell. Continuing the example from above, UE 120a derives an SSB index of the target cell 102b based on the timing of the serving cell 102a FIG. 9 is a flow diagram illustrating example operations 900 for wireless communication, in accordance with certain aspects of the present disclosure. The operations 900 may be performed, for example, by a serving cell served by a BS (e.g., such as the BS 110a in the wireless communication network 100). The operations 900 may be complementary to the operations 800 performed by the UE. The operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at block 902, by transmitting, to a user equipment (UE), an indication that synchronization signal block (SSB) indexes of a target cell operating on a second frequency can be derived from timing of the serving cell. For example, BS 110a (see FIG. 1) transmits (e.g., in a SIB), to UE 120a, an indication (e.g., an IE) that synchronization signal block indexes of a target cell 102b operating on a second frequency can be derived from timing of a serving cell 102a (served by BS 110a).

Operations 900 may continue, at block 904, by refraining from scheduling the UE to transmit or receive a communication during a period comprising: consecutive SSB symbols to be measured from the target cell within an SSB measurement time configuration (SMTC) window duration, 1 data symbol before the consecutive SSB symbols to be measured, and 1 data symbol after the consecutive SSB symbols to be measured. Continuing the example from above, the BS 110a refrains from scheduling UE 120a to transmit or receive a communication (e.g., a PUCCH, a PUSCH, an SRS, a PDCCH, a PDSCH, a TRS, or a CSI-RS for CQI) during a period comprising consecutive SSB symbols to be measured from the target cell 102b within an SSB measurement time configuration (SMTC) window duration, 1 data symbol before the consecutive SSB symbols to be measured, and 1 data symbol after the consecutive SSB symbols to be measured.

In another example of operations 900, the BS 110a (see FIG. 1) configures UE 120a with two MOs for measuring target cells 102b and 102c, and each MO configuration includes an IE indicating (i.e., a first field of the IE is set to true) that SSB indexes of the target cells 102b and 102c can be derived from timing of a serving cell 102a. In this example, the BS 110a refrains from scheduling UE 120a to transmit or receive a communication (e.g., a PUCCH, a PUSCH, an SRS, a PDCCH, a PDSCH, a TRS, or a CSI-RS for CQI) during a period comprising the union of the SSB symbols to be measured, 1 data symbol before each set of consecutive SSB symbols to be measured in the union, and 1 data symbol after each set of consecutive SSB symbols to be measured in the union.

Figure 10:
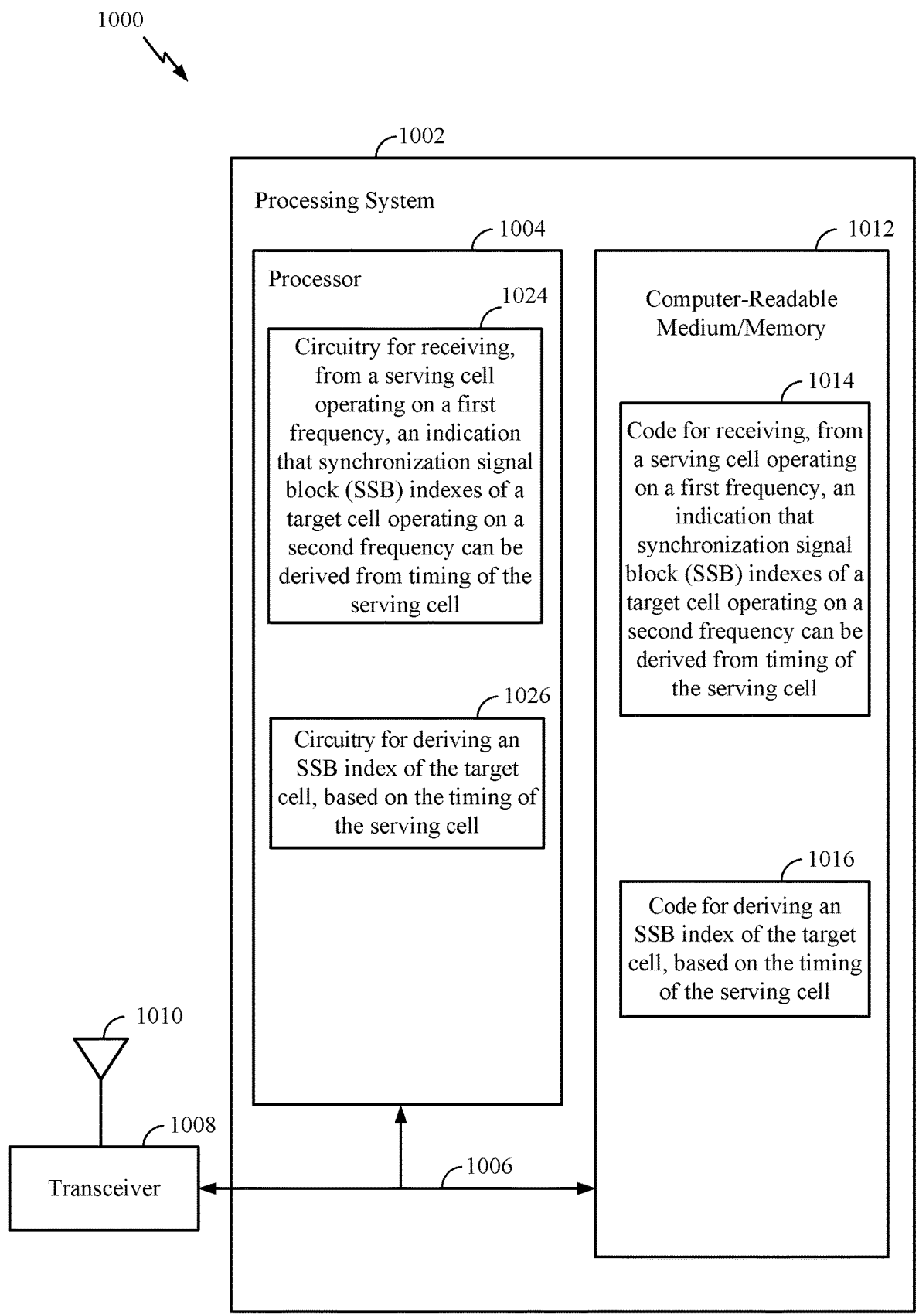
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for indicating to a UE performing inter-frequency measurements (intra-band and inter-band) that the UE may derive SSB indexes of target cells from the SFN, frame boundary, and/or SSB index of the serving cell of the UE. In certain aspects, computer-readable medium/memory 1012 stores code 1014 for receiving, from a serving cell operating on a first frequency, an indication that synchronization signal block (SSB) indexes of a target cell operating on a second frequency can be derived from timing of the serving cell; and code 1016 for deriving an SSB index of the target cell, based on the timing of the serving cell. In certain aspects, the processor 1004 has circuitry configured to implement the code stored in the computer-readable medium/memory 1012. The processor 1004 includes circuitry 1024 for receiving, from a serving cell operating on a first frequency, an indication that synchronization signal block (SSB) indexes of a target cell operating on a second frequency can be derived from timing of the serving cell; circuitry 1026 for deriving an SSB index of the target cell, based on the timing of the serving cell.

For example, means for transmitting (or means for outputting for transmission) may include a transmitter and/or an antenna(s) 234 or the BS 110*a* or the transmitter unit 254 and/or antenna(s) 252 of the UE 120*a* illustrated in FIG. 2. Means for receiving (or means for obtaining) may include a receiver and/or an antenna(s) 234 of the BS 110*a* or a receiver and/or antenna(s) 252 of the UE 120*a* illustrated in FIG. 2 and/or circuitry 1024 for receiving, from a serving cell operating on a first frequency, an indication that synchronization signal block (SSB) indexes of a target cell operating on a second frequency can be derived from timing of the serving cell of the communication device 1000 in FIG. 10. Means for communicating may include a transmitter, a receiver or both. Means for generating, means for performing, means for determining, means for taking action, means for determining, means for coordinating, and/or means for deriving may include a processing system, which may include one or more processors, such as the transmit processor 220, the TX MIMO processor 230, the receive processor 238, and/or the controller/processor 240 of the BS 110*a* or the receive processor 258, the transmit processor 264, the TX MIMO processor 266, and/or the controller/processor 280 of the UE 120*a* illustrated in FIG. 2 and/or the processing system 1002 of the communication device 1000 in FIG. 10.

Figure 11:
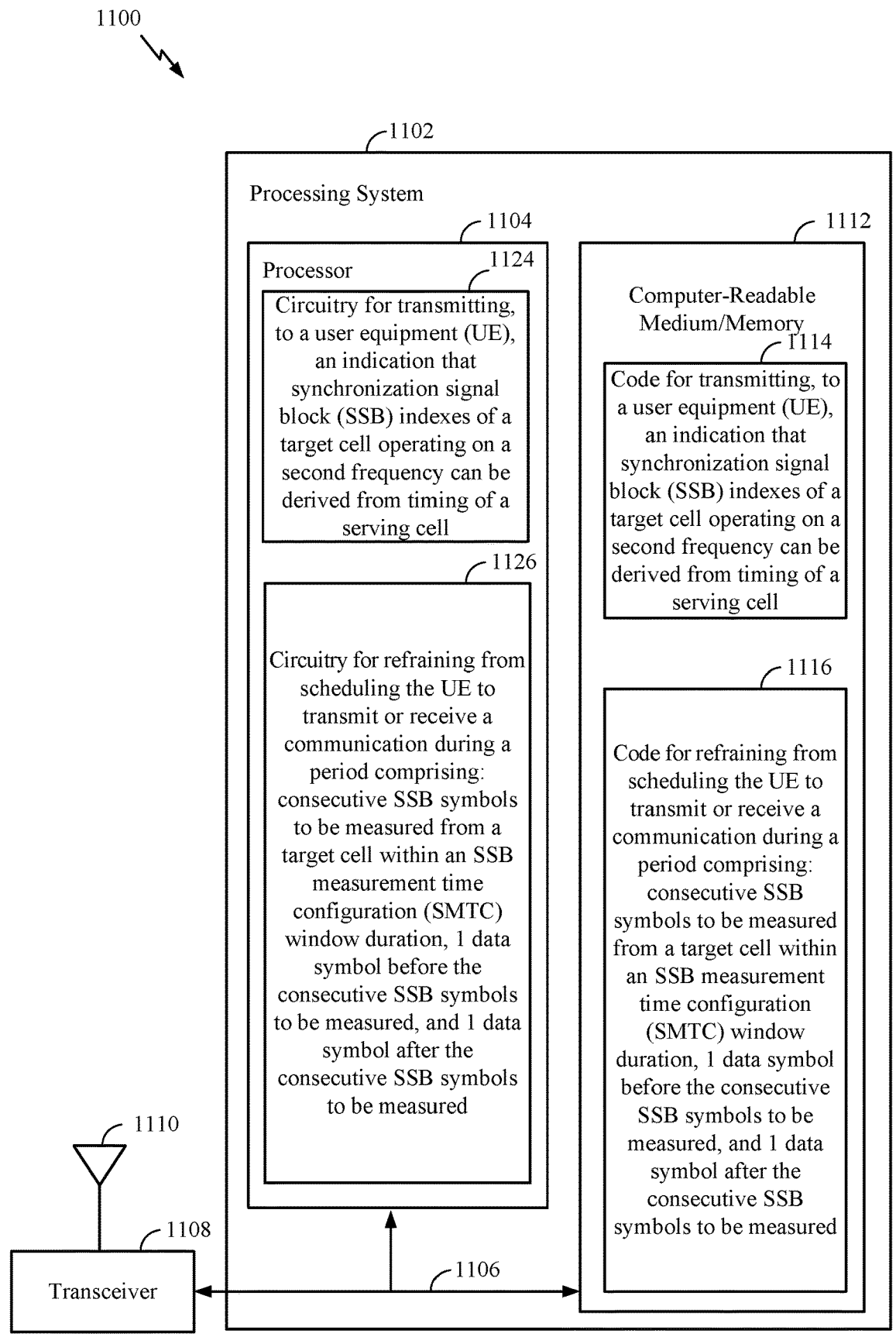
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for indicating to a UE performing inter-frequency measurements (intra-band and inter-band) that the UE may derive SSB indexes of target cells from the SFN, frame boundary, and/or SSB index of the serving cell of the UE. In certain aspects, computer-readable medium/memory 1112 stores code 1114 for transmitting, to a user equipment (UE), an indication that synchronization signal block (SSB) indexes of a target cell operating on a second frequency can be derived from timing of a serving cell; and code 1116 for refraining from scheduling the UE to transmit or receive a communication during a period comprising: consecutive SSB symbols to be measured from the target cell within an SSB measurement time configuration (SMTC) window duration, 1 data symbol before the consecutive SSB symbols to be measured, and 1 data symbol after the consecutive SSB symbols to be measured. In certain aspects, the processor 1104 has circuitry configured to implement the code stored in the computer-readable medium/memory 1112. The processor 1104 includes circuitry 1124 for transmitting, to a user equipment (UE), an indication that synchronization signal block (SSB) indexes of a target cell operating on a second frequency can be derived from timing of a serving cell; and circuitry 1126 for refraining from scheduling the UE to transmit or receive a communication during a period comprising: consecutive SSB symbols to be measured from the target cell within an SSB measurement time configuration (SMTC) window duration, 1 data symbol before the consecutive SSB symbols to be measured, and 1 data symbol after the consecutive SSB symbols to be measured.

For example, means for transmitting (or means for outputting for transmission) may include a transmitter and/or an antenna(s) 234 or the BS 110*a* or the transmitter unit 254 and/or antenna(s) 252 of the UE 120*a* illustrated in FIG. 2 and/or circuitry 1124 for transmitting, to a user equipment (UE), an indication that synchronization signal block (SSB) indexes of a target cell operating on a second frequency can be derived from timing of a serving cell of the communication device 1100 in FIG. 11. Means for receiving (or means for obtaining) may include a receiver and/or an antenna(s) 234 of the BS 110*a* or a receiver and/or antenna(s) 252 of the UE 120*a* illustrated in FIG. 2. Means for communicating may include a transmitter, a receiver or both. Means for generating, means for performing, means for determining, means for taking action, means for determining, means for coordinating, and/or means for refraining from scheduling may include a processing system, which may include one or more processors, such as the transmit processor 220, the TX MIMO processor 230, the receive processor 238, and/or the controller/processor 240 of the BS 110*a* or the receive processor 258, the transmit processor 264, the TX MIMO processor 266, and/or the controller/processor 280 of the UE 120*a* illustrated in FIG. 2 and/or the processing system 1102 of the communication device 1100 in FIG. 11.

Indicating to a UE performing inter-frequency measurements (intra-band and inter-band) that the UE may derive SSB indexes of target cells from the SFN, frame boundary, and/or SSB index of the serving cell of the UE may enable the UE to have higher data throughput, because the UE is able to transmit and/or receive during symbols that the UE is not measuring SSB of the target cell.

EXAMPLE CLAUSES

Implementation examples are described in the following numbered clauses:

Clause 1. A method for wireless communication by a user equipment (UE), comprising: receiving, from a serving cell operating on a first frequency, an indication that synchronization signal block (SSB) indexes of a target cell operating on a second frequency can be derived from timing of the serving cell; and deriving an SSB index of the target cell, based on the timing of the serving cell.

Clause 2. The method of clause 1, further comprising: receiving an indication of an index of another serving cell within a cell group including the serving cell, wherein deriving the SSB index of the target cell further comprises deriving the SSB index of the target cell based on a timing of the other serving cell.

Clause 3. The method of any of clauses 1 to 2, wherein the indication is received in a broadcast transmission.

Clause 4. The method of any of clauses 1 to 2, wherein the indication is received in a UE-specific transmission.

Clause 5. The method of clause 4, wherein receiving the indication comprises receiving the indication in an RRCRelease message to the UE.

Clause 6. The method of clause 4, wherein receiving the indication comprises receiving the indication in a in a measurement object (MO) configuration.

Clause 7. The method of any of clauses 1 to 6, wherein deriving the SSB index of the target cell comprises: assuming a system frame number (SFN) for the target cell equal to an SFN for the serving cell; determining a frame boundary for the target cell aligned with a frame boundary for the serving cell; and determining the SSB index of the target cell based on the SFN for the target cell, the frame boundary for the target cell, and the SSB index of the serving cell.

Clause 8. The method of any of clauses 1 to 7, wherein the first frequency and the second frequency are different but in a same frequency band.

Clause 9. The method of any of clauses 1 to 7, wherein: the first frequency is in a first frequency band; the second frequency is in a second frequency band; and the serving cell and the target cell operate using common beam management (CBM).

Clause 10. The method of any of clauses 1 to 9, wherein the indication comprises an indication for the UE to use network configured small gaps (NCSGs).

Clause 11. A method for wireless communications by a serving cell operating on a first frequency, comprising: transmitting, to a user equipment (UE), an indication that synchronization signal block (SSB) indexes of a target cell operating on a second frequency can be derived from timing of a serving cell; and refraining from scheduling the UE to transmit or receive a communication during a period comprising: consecutive SSB symbols to be measured from a target cell within an SSB measurement time configuration (SMTC) window duration, 1 data symbol before the consecutive SSB symbols to be measured, and 1 data symbol after the consecutive SSB symbols to be measured.

Clause 12. The method of clause 11, further comprising: transmitting an indication of an index of another serving cell within a cell group including the serving cell, wherein the index of the other serving cell indicates to the UE that SSB indexes of the target cell can be derived from timing of the other serving cell.

Clause 13. The method of any of clauses 11 to 12, wherein the indication is transmitted in a broadcast transmission.

Clause 14. The method of any of clauses 11 to 12, wherein the indication is transmitted in a UE-specific transmission.

Clause 15. The method of clause 14, wherein transmitting the indication comprises transmitting the indication in an RRCRelease message to the UE.

Clause 16. The method of clause 14, wherein transmitting the indication comprises transmitting the indication in a measurement object (MO) configuration.

Clause 17. The method of any of clauses 11 to 16, wherein the first frequency and the second frequency are in a same frequency band.

Clause 18. The method of any of clauses 11 to 16, wherein: the first frequency is in a first frequency band; the second frequency is in a second frequency band; and the serving cell and the target cell operate using common beam management (CBM).

Clause 19. The method of any of clauses 11 to 18, wherein the indication comprises an indication for the UE to use network configured small gaps (NCSGs).

Clause 20. An apparatus comprising means for performing the method of any of clauses 1 through 19.

Clause 21. An apparatus comprising a processor; a memory coupled with the processor, instructions stored in the memory and executable by the processor to cause the apparatus to perform the method of any of clauses 1 through 19.

Clause 22. A computer readable medium storing computer executable code thereon for wireless communications that, when executed by at least one processor, cause an apparatus to perform the method of any of clauses 1 through 19.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communications at a user equipment (UE), comprising:
 a processor;
 memory coupled with the processor; and
 instructions stored in the memory and executable by the processor to cause the apparatus to:
  receive, from a serving cell operating on a first frequency, an indication that synchronization signal block (SSB) indexes of a target cell operating on a second frequency can be derived from timing of the serving cell; and derive an SSB index of the target cell, based on the timing of the serving cell.

2. The apparatus of claim 1, wherein the instructions further comprise instructions to cause the apparatus to:
receive an indication of an index of another serving cell within a cell group including the serving cell, wherein the instructions to derive the SSB index of the target cell further comprise instructions to derive the SSB index of the target cell based on a timing of the other serving cell.

3. The apparatus of claim 1, wherein the instructions to receive the indication comprise instructions to receive the indication in a broadcast transmission.

4. The apparatus of claim 1, wherein the instructions to receive the indication comprise instructions to receive the indication in a UE-specific transmission.

5. The apparatus of claim 4, wherein the instructions to receive the indication comprise instructions to receive the indication in an RRCRelease message to the UE.

6. The apparatus of claim 4, wherein the instructions to receive the indication comprise instructions to receive the indication in a measurement object (MO) configuration.

7. The apparatus of claim 1, wherein the instructions to derive the SSB index of the target cell comprise instructions to:
assume a system frame number (SFN) for the target cell equal to an SFN for the serving cell;
determine a frame boundary for the target cell aligned with a frame boundary for the serving cell; and
determine the SSB index of the target cell based on the SFN for the target cell, the frame boundary for the target cell, and the SSB index of the serving cell.

8. The apparatus of claim 1, wherein the first frequency and the second frequency are different but in a same frequency band.

9. The apparatus of claim 1, wherein:
the first frequency is in a first frequency band;
the second frequency is in a second frequency band; and
the serving cell and the target cell operate using common beam management (CBM).

10. The apparatus of claim 1, wherein the indication comprises an indication for the UE to use network configured small gaps (NCSGs).

11. An apparatus for wireless communications at a serving cell operating on a first frequency, comprising:
a processor;
memory coupled with the processor; and
instructions stored in the memory and executable by the processor to cause the apparatus to:
transmit, to a user equipment (UE), an indication that synchronization signal block (SSB) indexes of a target cell operating on a second frequency can be derived from timing of the serving cell; and
refrain from scheduling the UE to transmit or receive a communication during a period comprising: consecutive SSB symbols to be measured from the target cell within an SSB measurement time configuration (SMTC) window duration, 1 data symbol before the consecutive SSB symbols to be measured, and 1 data symbol after the consecutive SSB symbols to be measured.

12. The apparatus of claim 11, wherein the instructions further comprise instructions to cause the apparatus to:
transmit an indication of an index of another serving cell within a cell group including the serving cell, wherein the index of the other serving cell indicates to the UE that SSB indexes of the target cell can be derived from timing of the other serving cell.

13. The apparatus of claim 11, wherein the instructions to transmit the indication comprise instructions to transmit the indication in a broadcast transmission.

14. The apparatus of claim 11, wherein the instructions to transmit the indication comprise instructions to transmit the indication in a UE-specific transmission.

15. The apparatus of claim 14, wherein the instructions to transmit the indication comprise instructions to transmit the indication in an RRCRelease message to the UE.

16. The apparatus of claim 14, wherein the instructions to transmit the indication comprise instructions to transmit the indication in a measurement object (MO) configuration.

17. The apparatus of claim 11, wherein the first frequency and the second frequency are in a same frequency band.

18. The apparatus of claim 11, wherein:
the first frequency is in a first frequency band;
the second frequency is in a second frequency band; and
the serving cell and the target cell operate using common beam management (CBM).

19. The apparatus of claim 11, wherein the indication comprises an indication for the UE to use network configured small gaps (NCSGs).

20. An apparatus for wireless communication at a user equipment (UE), comprising:
means for receiving, from a serving cell operating on a first frequency, an indication that synchronization signal block (SSB) indexes of a target cell operating on a second frequency can be derived from timing of the serving cell; and
means for deriving an SSB index of the target cell, based on the timing of the serving cell.

21. The apparatus of claim 20, further comprising:
means for receiving an indication of an index of another serving cell within a cell group including the serving cell, wherein the means for deriving the SSB index of the target cell further comprise means for deriving the SSB index of the target cell based on a timing of the other serving cell.

22. The apparatus of claim 20, wherein the means for receiving the indication comprise means for receiving the indication in a broadcast transmission.

23. The apparatus of claim 20, wherein the means for receiving the indication comprise means for receiving the indication in a UE-specific transmission.

24. The apparatus of claim 23, wherein the means for receiving the indication comprise means for receiving the indication in an RRCRelease message to the UE.

25. The apparatus of claim 23, wherein the means for receiving the indication comprise means for receiving the indication in a measurement object (MO) configuration.

26. The apparatus of claim 20, wherein the means for deriving the SSB index of the target cell comprise:
means for assuming a system frame number (SFN) for the target cell equal to an SFN for the serving cell;
means for determining a frame boundary for the target cell aligned with a frame boundary for the serving cell; and
means for determining the SSB index of the target cell based on the SFN for the target cell, the frame boundary for the target cell, and the SSB index of the serving cell.

27. The apparatus of claim 20, wherein the first frequency and the second frequency are different but in a same frequency band.

28. The apparatus of claim 20, wherein:
the first frequency is in a first frequency band;
the second frequency is in a second frequency band; and
the serving cell and the target cell operate using common beam management (CBM).

29. The apparatus of claim 20, wherein the indication comprises an indication for the UE to use network configured small gaps (NCSGs).

30. An apparatus for wireless communication at a serving cell operating on a first frequency, comprising:
means for transmitting, to a user equipment (UE), an indication that synchronization signal block (SSB) indexes of a target cell operating on a second frequency can be derived from timing of the serving cell; and
means for refraining from scheduling the UE to transmit or receive a communication during a period comprising: consecutive SSB symbols to be measured from the target cell within an SSB measurement time configuration (SMTC) window duration, on 1 data symbol before the consecutive SSB symbols to be measured, and on 1 data symbol after the consecutive SSB symbols to be measured.

* * * * *